(12) United States Patent
Shelley

(10) Patent No.: US 8,591,704 B2
(45) Date of Patent: Nov. 26, 2013

(54) FLUID FRACTIONATION PROCESS AND APPARATUS

(75) Inventor: Stephen Shelley, Victoria (AU)

(73) Assignee: Creative Water Technology Ltd., Victoria (AU)

( * ) Notice: Subject to any disclaimer, the term of this patent is extended or adjusted under 35 U.S.C. 154(b) by 438 days.

(21) Appl. No.: 12/933,130

(22) PCT Filed: Mar. 20, 2009

(86) PCT No.: PCT/AU2009/000324
§ 371 (c)(1),
(2), (4) Date: Oct. 20, 2010

(87) PCT Pub. No.: WO2009/114907
PCT Pub. Date: Sep. 24, 2009

(65) Prior Publication Data
US 2011/0031101 A1 Feb. 10, 2011

(30) Foreign Application Priority Data

Mar. 20, 2008 (AU) ................................ 2008901395

(51) Int. Cl.
*B01D 1/16* (2006.01)
*B01D 1/26* (2006.01)
*B01D 3/42* (2006.01)
*B01D 9/02* (2006.01)
*C02F 9/00* (2006.01)
*C02F 1/04* (2006.01)

(52) U.S. Cl.
USPC ........ 203/3; 203/12; 203/22; 203/48; 203/87; 203/90; 202/155; 202/174; 202/185.1; 202/192; 159/4.09; 159/4.1; 159/17.1; 159/48.1; 159/48.2; 95/224; 210/806; 210/252; 210/253

(58) Field of Classification Search
USPC .............. 202/155, 156, 172, 173, 174, 185.1, 202/189, 195, 196; 203/3, 12, 22, 47, 48, 203/73, 87, 90; 159/3, 4.09, 4.1, 17.1, 17.2, 159/17.3, 17.4, 47.1, 47.2, 47.3, 48.1, 48.2; 95/224; 210/767, 806, 123, 124, 127, 210/252, 253, 258
See application file for complete search history.

(56) References Cited

U.S. PATENT DOCUMENTS 2,148,712 A 2/1939 Reich
3,310,410 A * 3/1967 Lang et al. .................... 426/387

(Continued)

FOREIGN PATENT DOCUMENTS

GB 259747 10/1926
GB 997501 7/1965

*Primary Examiner* — Nina Bhat
*Assistant Examiner* — Jonathan Miller
(74) *Attorney, Agent, or Firm* — The Ollila Law Group LLC

(57) ABSTRACT

A fractionation process for producing at least two concentration fractions of a fluid including a solute, suspended or dissolved content using at least two fluidly connected evaporator units is provided. The process includes the steps of: feeding a feed fluid including a solute, suspended or dissolved content into at least a first evaporator unit; evaporating a first amount of fluid from the feed fluid in at least the first evaporator unit to produce a first concentrated fluid; feeding at least a portion of the first concentrated fluid into at least a second evaporator unit; and evaporating a second amount of fluid from the first concentrated fluid in at least the second evaporator unit to produce a second concentrated fluid.

21 Claims, 4 Drawing Sheets

(56) References Cited

U.S. PATENT DOCUMENTS

| | | | |
|---|---|---|---|
| 3,351,120 A * | 11/1967 | Goeldner et al. | 159/13.3 |
| 3,807,479 A * | 4/1974 | Brannland et al. | 159/47.1 |
| 3,844,899 A * | 10/1974 | Sager, Jr. | 202/173 |
| 3,875,017 A | 4/1975 | Saari et al. | |
| 3,941,663 A | 3/1976 | Steinbruchel | |
| 4,046,637 A * | 9/1977 | Sasaki | 202/174 |
| 4,495,212 A | 1/1985 | Ciboit | |
| 5,076,895 A * | 12/1991 | Greenfield et al. | 203/10 |
| 5,346,592 A * | 9/1994 | Madani | 202/176 |
| 6,833,056 B1 * | 12/2004 | Kamiya et al. | 202/155 |
| 7,794,564 B2 * | 9/2010 | Praschak | 159/24.1 |
| 8,328,995 B2 * | 12/2012 | Eddington | 203/10 |
| 2004/0079491 A1 * | 4/2004 | Harris et al. | 159/16.1 |
| 2006/0157338 A1 * | 7/2006 | Eddington | 203/21 |

* cited by examiner

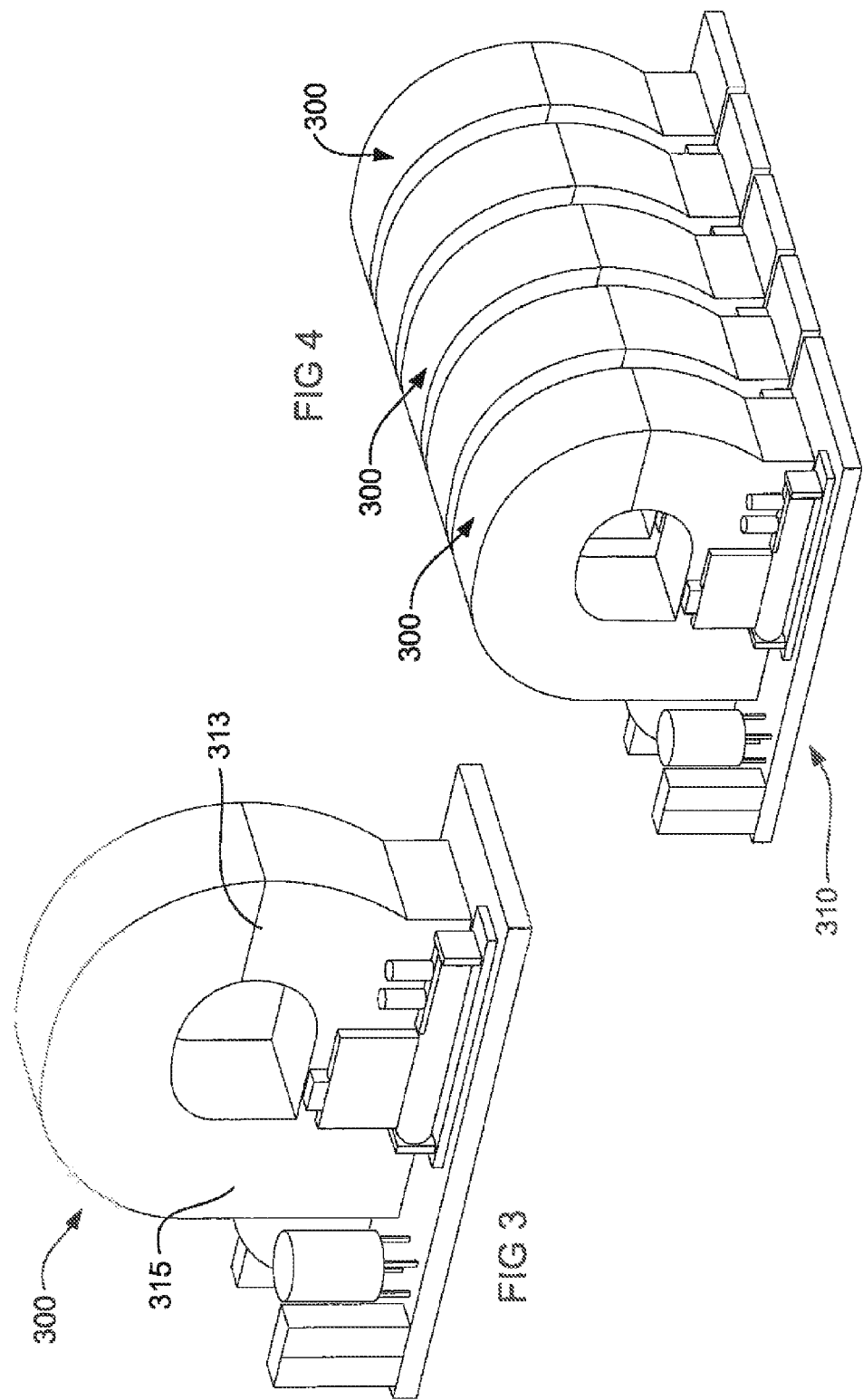

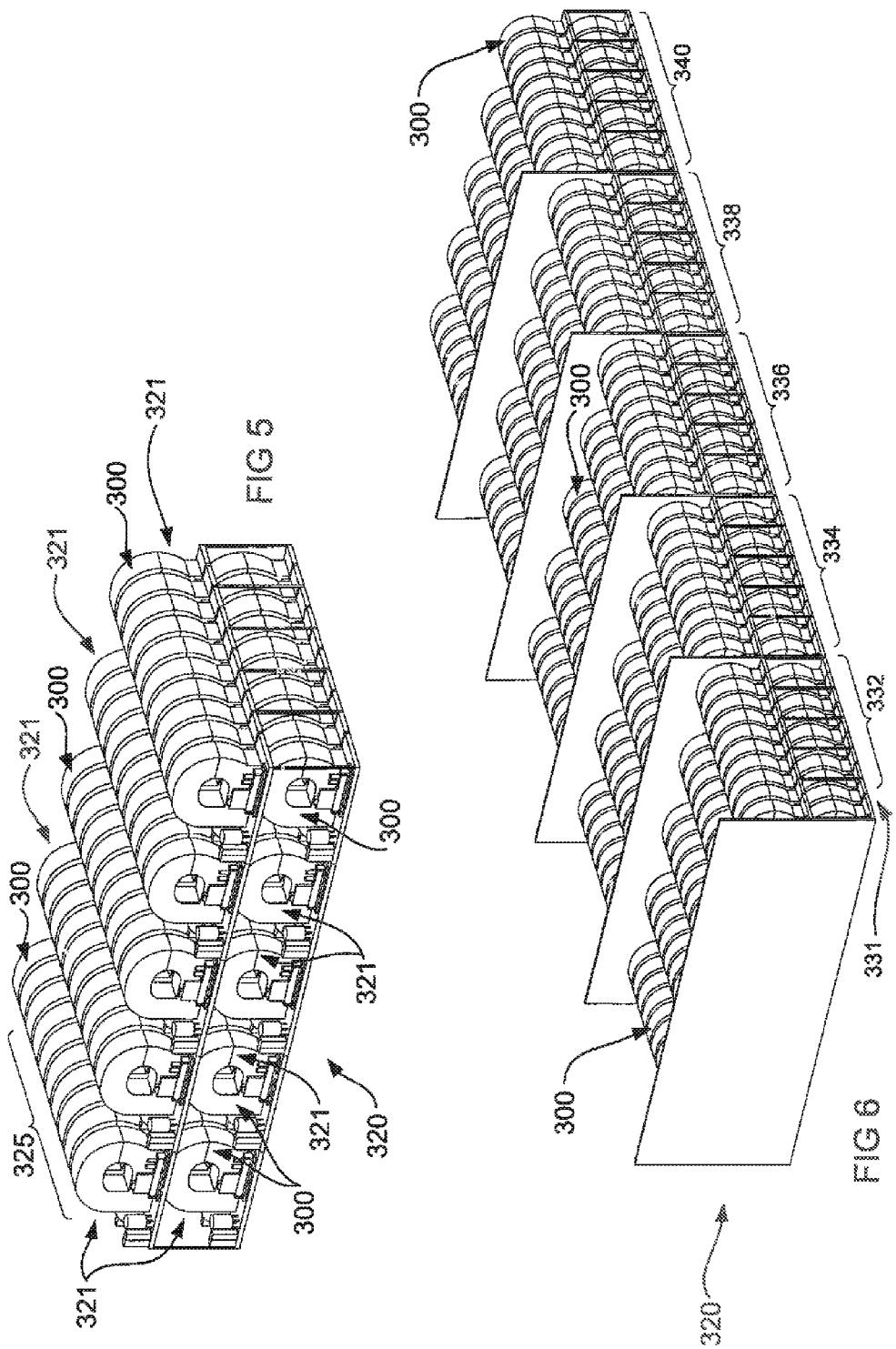

FLUID FRACTIONATION PROCESS AND APPARATUS

FIELD OF THE INVENTION

The present invention generally relates to a fluid fractionation process and apparatus used therein. The invention is particularly applicable for recovering selected concentration and/or compositional fractions from an aqueous solution and it will be convenient to hereinafter disclose the invention in relation to that exemplary application. However, it is to be appreciated that the invention may be readily adapted for use in other applications and other types of fluid.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Natural water sources can contain a variety of solutes, minerals, salts or other dissolved or suspended substances of interest. For example, water sources can contain solids including Boron, Phosphorus, Manganese, Iron, Cobalt, Nickel, Copper, Zinc, Lead, Aluminium or the like and solutes for example Sodium Chloride (table salt).

It can be desirable to be able to control the concentration of these solutes and dissolved substances within the water mixture. For example, when manufacturing mineral water, it can be desirable to produce a mineral water having a substantially constant dissolved mineral content. In other applications, for example in sodium chloride extraction, it can be desirable to produce different concentration fractions of brine for various uses.

SUMMARY OF THE INVENTION

According to the present invention, there is provided a fractionation process for producing at least two concentration fractions of a fluid including a solute, suspended or dissolved content using at least two fluidly connected evaporator units. The process includes the steps of:
feeding a feed fluid including a solute, suspended or dissolved content into at least a first evaporator unit;
evaporating a first amount of fluid from the feed fluid in at least the first evaporator unit to produce a first concentrated fluid;
feeding at least a portion of the first concentrated fluid into at least a second evaporator unit; and
evaporating a second amount of fluid from the first concentrated fluid in at least the second evaporator unit to produce a second concentrated fluid.

The present invention therefore provides a process in which two fluidly connected evaporator units produce at least two different concentration fractions of a fluid that is fed into the process. In this respect, each evaporator removes an amount of the fluid content of the fluid thereby concentrating the suspended or dissolved content relative to the fluid content. The various concentration fractions produced can be selectively utilised.

Each evaporating step generally relates to the process of converting or changing a portion of the fluid fed into the evaporator unit into a vapour. This can be achieved by allowing or encouraging evaporation within an evaporation unit by any suitable means.

The process of the present invention can include further evaporating steps which produce further concentration fractions of the fluid. Accordingly, some embodiments of the process according to the present invention include at least one further evaporator unit fluidly connected to at least one of the first or second evaporator units in which one or more further evaporating steps are undertaken. In such a process, a further amount of fluid is evaporated from the concentrated fluid fed into the further evaporator unit to produce a further concentrated fluid.

Each of the first, second and further evaporator units are preferably connected in series. The fluid fed into the first evaporator unit therefore follows a single connected fluid path through the second evaporator unit and then the subsequent one or more further evaporator units.

Of course, one or more of the respective evaporating steps can be conducted in at least two operatively connected evaporator units. In this respect, the various evaporator units could be operatively connected with one or more complementary evaporator units. Each of the complementary evaporator units operate in parallel to the respective evaporator unit(s) and as such are fed substantially the same feed fluid as that evaporator unit and produce substantially the same concentrated fluid.

The process of the present invention can include any number of fluidly connected series of evaporating steps and each of these connected series of evaporating steps could be operatively connected to any number of corresponding parallel and operatively connected evaporating steps. This would involve the use of an array of operatively connected and fluidly connected evaporator units. Each of the evaporator units could be arranged in a single linear array in the case of a single series of evaporating steps, a two dimensional array in the case of a multiple series of evaporating steps arranged in parallel, or even a three dimensional array.

The process of the present invention can preferably include the step of feeding a selected amount of the initial feed fluid into any evaporation unit to facilitate the precise control of the concentration of the fluid within that evaporation unit.

In some exemplary embodiments, the fluid evaporated from each of the various evaporating steps is utilised in external applications. For example, when the fluid fed into the process includes water, any water produced through the evaporation steps could be used as a water source for a further process or application. Such a fluid source is preferably used in a liquid form. It is therefore preferable for the process according to the present invention to include a step of condensing the fluid evaporated during the evaporating step after one or more of the respective evaporating steps. Condensing the evaporated fluid allows the fluid to be more easily transported and moved to a location remote from the process.

It is preferable for one or more of the condensing steps to include a step of transferring energy from the fluid evaporated during the evaporating step to the respective concentrated fluid fed into a proceeding evaporator unit. This step facilitates transfer of energy from the evaporated fluid to a process step within the process. Accordingly, a heat source is utilised in the process which may otherwise be wasted and resultantly increases the thermal efficiency of the process.

It should be appreciated that the thermal energy transferred from the evaporated fluid to the concentrate fluid can be in the form of one or both of the sensible heat of the evaporated fluid and/or latent heat of condensation of fluid in the evaporated fluid.

One or more of the condensing steps are preferably conducted in a heat exchanger. The heat exchanger can be any suitable type of heat exchanger capable of handling a condensing gaseous stream and a liquid stream.

Suitable heat exchangers include plate heat exchangers, double pipe heat exchangers, shell and tube heat exchangers or the like. Preferably, the heat exchanger is a purpose built condenser type heat exchanger.

The evaporating steps can comprise any suitable evaporation process which evaporates a portion of fluid from the fluid fed into the respective evaporator unit. In one preferred embodiment, one or more of the evaporating steps comprises an adiabatic evaporation process. By using adiabatic evaporation, the process can operate at relatively low temperatures and at atmospheric pressures. In comparison, other evaporation techniques which include boiling the fluid require high temperatures and/or low pressures to achieve evaporation. The use of low temperatures and atmospheric pressure can therefore reduce the cost and complexity of evaporator units used in the process and enable the use of low grade heat (and in some embodiments waste heat) for the evaporating steps.

In some embodiments, the process of the present invention can include a step in which a portion of the first, second or a further concentrated fluid is diverted from a flow path from between the respective first, second or a further evaporator and the proceeding evaporator unit. In such embodiments, that diverted portion of the first, second or a further concentrated fluid can be can be selectively utilised by a user.

In some embodiments, the process of the present invention can include a step in which the concentration of the suspended or dissolved content of one or more of the first, second or a further concentrated fluid is controlled within a predetermined concentration range. This control can be achieved by controlling any number of process variables of the process. However, it is preferable for one or more of a temperature of the fluid fed into the respective evaporator unit, the internal pressure of the respective evaporator unit, the flow rate of concentrated fluid removed from the respective evaporator unit, or the flow rate of the initial feed fluid that is fed into the respective evaporator unit are controlled in order to maintain the concentration of the suspended or dissolved content of one or more of the first, second or a further concentrated fluid within a predetermined concentration range.

It can be desirable to recover one or more of the suspended or dissolved content from the various concentrated fluids. Accordingly, various additives, surfactants, flotation additives or other separation aids can be added to the fluid fed into an evaporator unit and/or concentrated fluid in order to facilitate recovery of the one or more of the suspended or dissolved content. In some embodiments, the process of the present invention can include a step of introducing at least one additive to crystalise one or more of the suspended or dissolved content of the first, second or a further concentrated fluid.

According to another aspect of the present invention, there is provided a fractionation system for producing at least two concentration fractions of a fluid including a solute, suspended or dissolved content. The system includes: a first evaporator unit for evaporating a first amount of fluid from a first feed fluid to produce a first concentrated fluid; and a second evaporator unit for evaporating a second amount of fluid from a second feed fluid to produce a second concentrated fluid. The second evaporator unit is fluidly connected to the first evaporator unit such that the first concentrated fluid is the second feed fluid.

The fractionation system can preferably include at least one further evaporator unit, each evaporator unit being fluidly connected to a preceding evaporator unit such that the concentrated fluid from the preceding evaporator unit is fed into the at least one further evaporator unit. Furthermore, some embodiments of the fractionation system can also have one or more of the first, second or further evaporator unit connected in parallel to one or more complementary evaporator units. The complementary evaporator units are fed substantially the same fed fluid as the first, second or further evaporator unit respectively and produce substantially the same first, second or further concentrated fluid. Preferably, one or more of the complementary evaporator units are fluidly connected to a further evaporator unit.

A fractionation system according to the present invention can therefore include any number of fluidly connected series of evaporator units and each of these connected series could be operatively connected to any number corresponding parallel and operatively connected evaporator units. Each of the evaporator units could be arranged in a single linear array in the case of a single series of evaporating steps, a two dimensional array in the case of a multiple series of evaporating steps arranged in parallel, or even a three dimensional array.

The fractionation system can, in some embodiments, include a condensing unit in which at least one of the first, second or a further amount of fluid evaporated in the respective evaporator unit is condensed. Preferably, the condensing unit comprises a heat exchanger in which energy is transferred from the first, second or a further amount of fluid respectively to the second, or a further concentrated fluid fed into a proceeding evaporator unit. As noted above, this increases the thermal efficiency of the system.

It is preferable for the fractionation system to further include a controller for controlling the concentration of the suspended or dissolved content of one or more of the first, second or a further concentrated fluid within predetermined concentration range. Accordingly, each of the concentration fractions produced by the respective evaporative units can be selectively controlled to produce a concentrated fluid including a solute, suspended or dissolved content within a predetermined and preferably repeatable concentration range.

The evaporator units can include any suitable process step that can facilitate the evaporating step conducted therein.

In some embodiments, one or more of the evaporator units includes a spray device for spraying liquid fed into that evaporator unit. In terms of the process according to the present invention, one or more of the evaporating steps preferably include the step of spraying into the respective evaporator unit the fluid fed into the respective evaporator unit. Spraying the feed fluid into the evaporator unit separates the feed fluid into droplets which provide a greater surface area and therefore facilitates evaporation within the evaporator unit.

In some embodiments, each evaporator unit includes a sump in which the respective concentrated fluid is collected, each sump being in fluid connection with an inlet of a proceeding evaporator unit. It should be appreciated that in such embodiments, the temperature, volume/amount and rate of removal of fluid from the sump can affect the concentration of suspended or dissolved content within the sump.

In some embodiments, one or more of the evaporator units includes a fan unit for producing convective heat transfer conditions within the evaporator unit to enhance evaporation of the fluid fed into the respective evaporator unit. Preferably, the fan unit produces a transverse, counter current of other desired directional air flow to the fluid fed into the evaporator unit.

BRIEF DESCRIPTION OF THE DRAWINGS

The present invention will now be described with reference to the figures of the accompanying drawings, which illustrate particular preferred embodiments of the present invention, wherein:

FIG. 3 is a perspective view the evaporator unit shown in FIG. 2.

FIG. 4 is a perspective view of a linear array of evaporator units shown in

FIG. 3 used in a concentration fractionation process according to the present invention.

FIG. 5 is a perspective view of a multidimensional array of evaporator units shown in FIG. 3 used in a concentration fractionation process according to the present invention.

FIG. 6 is a perspective view of another multidimensional array of evaporator units shown in FIG. 3 used in a concentration fractionation process according to the present invention.

DETAILED DESCRIPTION

Figure 1:
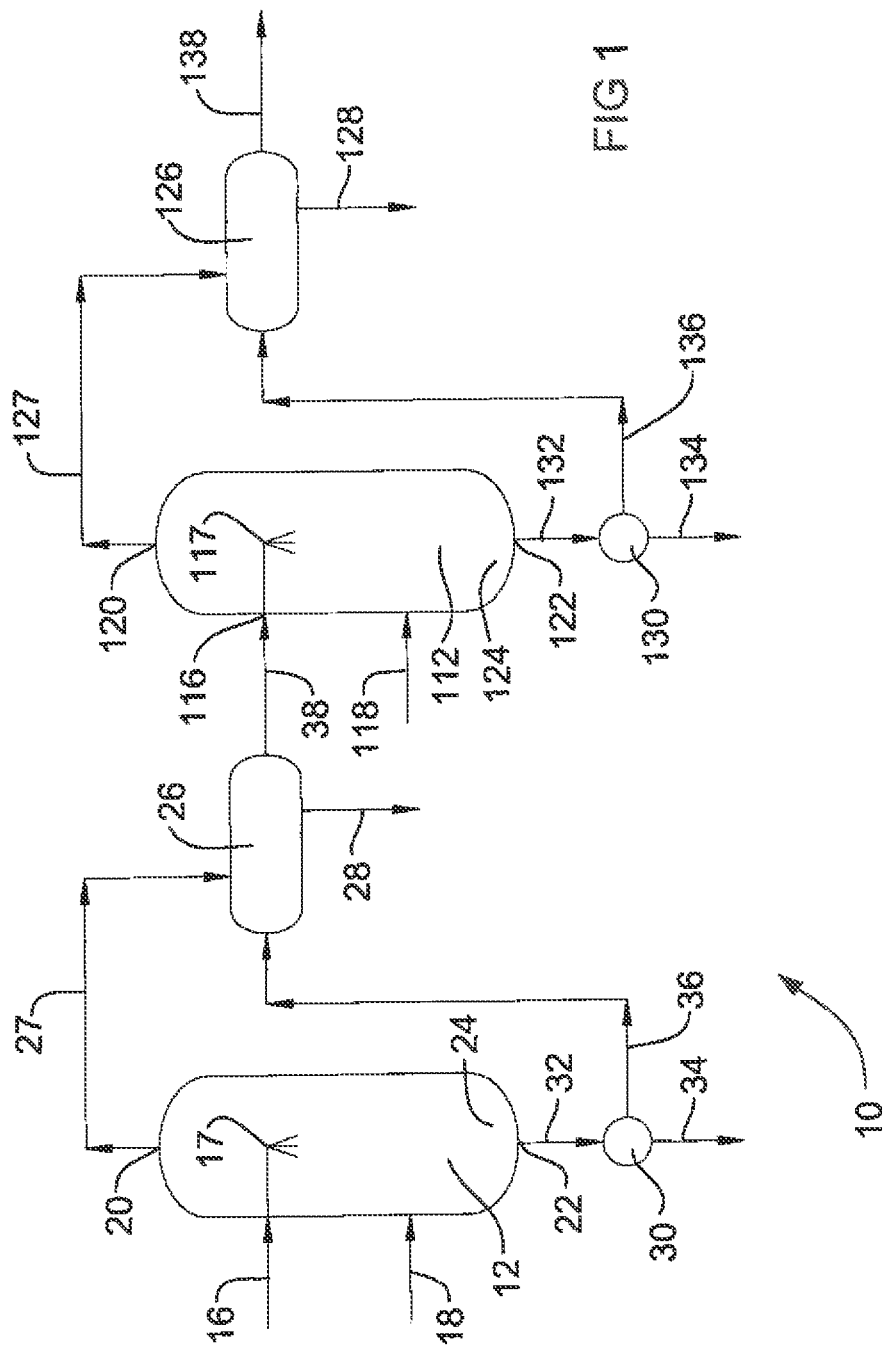
FIG. 1 is a general process diagram of one concentration fractionation process according to one embodiment of the present invention.

Referring to FIG. 1, there is shown a general process flow diagram of one embodiment of the fractionation process 10 according to the present invention.

The illustrated fractionation process 10 includes two evaporator units 12 and 112 fluidly connected in series. The first evaporator unit 12 is a spray feed evaporator unit having a feed inlet 16 through which fluid is fed into the first evaporator unit 12 through a spray device 17. Fluid droplets fall downwardly through the evaporator unit 12. The first evaporator unit 12 also includes an air inlet 18 through which dry air is blown into the first evaporator unit 12 in a transverse, counter-current or other suitable direction relative to the fluid droplets from the spray device 17 using a fan or similar device. Fluid outlets 20 and 22 are also provided at the top and bottom of the first evaporator unit 12.

A top outlet 20 is provided for vapour or gaseous streams to exit the first evaporator unit 12. The top outlet 20 is fluidly connected to a condenser unit 26. The condenser unit 26 functions to condense any vapour in outlet stream 27. A liquid product exits the condenser unit 26 through liquid product stream 28. The condenser unit 26 can be any suitable type of heat exchanger capable of handling a condensing gaseous stream and a liquid stream. Suitable condenser units 26 include plate heat exchangers, a double pipe heat exchanger, shell and tube heat exchangers or the like.

Any fluid fed into the first evaporator unit 12 that is not evaporated collects in the sump section 24 of the first evaporator unit 12. A bottom outlet 22 is provided to drain a liquid product from a sump section 24 of the first evaporator unit 12. The bottom outlet 22 is fluidly connected to a diverter valve 30 which can be used to divert a predetermined amount of fluid from fluid stream 32 to a product stream 34. The remaining fluid from fluid stream 32 flows to the inlet of the other side of the condenser unit 26. A heated fluid stream exits outlet 38 of the condenser unit 26 and is fed directly into an inlet 116 of the second evaporator unit 112.

The illustrated condenser unit 26 transfers energy from the condensing fluid from stream 27 to the fluid fed from stream 36. It is to be appreciated that the condenser unit 26 is intended to only transfer heat energy to stream 36 inputted into the condenser unit 26 by removing that heat energy from the stream 27 that was fed into condenser unit 26. Furthermore, it should be appreciated that at least some of the feed water input to the condenser unit 26 is provided to the second evaporator unit 112.

This process step facilitates transfer of energy from the evaporated fluid to a process stream within the process. Accordingly, a heat source is utilised in the process which may otherwise be wasted increasing the thermal efficiency of the process. The thermal energy transferred from the evaporated fluid to the concentrate fluid can be in the form of one or both of the sensible heat of the evaporated fluid and/or latent heat of condensation of fluid in the evaporated fluid.

The second evaporator unit 112 and peripherals (condenser 126 and diverter valve 130) comprise substantially the same process equipment as the first evaporator unit 12. Accordingly, similar parts in the second evaporator unit 112 have been designated with the same reference numerals as those parts of the first evaporator unit 12 plus 100. It is to be understood that the preceding description for the first evaporator unit 12 is applicable to each of the components of the second evaporator unit 112.

In operation, a fluid including a solute, suspended or dissolved content for example a water source containing suspended and/or dissolved solids including Boron, Phosphorus, Manganese, Iron, Cobalt, Nickel, Copper, Zinc, Lead, Aluminium or the like and solutes such as Sodium Chloride (table salt) is fed into the inlet of the first evaporator 12. The fluid is sprayed through spray device 17 to form droplets of the fluid. Air from air inlet 18 is blown through the fluid droplets from the spray device 17 in a counter-current direction to the fluid droplets causing a portion of the fluid content to be evaporated. Preferably, this evaporation process is an adiabatic process which occurs at a temperature below the boiling point of the fluid.

The evaporated fluid (in vapour form) flows upwardly and exits the first evaporator unit 12 through the top outlet 20. This fluid flows to a vapour side (not illustrated) of the condenser 26 and is condensed therein. The resulting fluid (for example water in the case of a water source) exits the condenser through product stream 28. This fluid is substantially purified by the evaporation process and therefore can be used in other applications. In the case of water sources, aqueous solutions, for example salt water, the resulting product is a substantially purified water. This purified water can be used as a fresh water source for other application such as drinking water (if it is potable), process water, irrigation water or similar.

The remaining fluid that is not evaporated in the first evaporator unit 12 falls downwardly through the first evaporator unit 12 and is collected in the sump 24 of the first evaporator unit 12. Any solute, suspended or dissolved content of the fluid will now be more concentrated (relative to the volume of the fluid) due to the removal of a portion of the fluid content of the fluid solution fed into the first evaporator unit 12. This forms a first concentration fraction of the fluid for this process 10. Of course, any volatile suspended or dissolved content of the fluid may be removed with the evaporation process. Accordingly, the present process 10 may not be suitable for forming more concentrated fluid solutions of this type of fluid content.

This concentrated fluid flows out from the bottom outlet 22 to the diverter valve 30 where any desired amount of the concentrated fluid can be removed from the process. The remaining concentrated fluid flows to the inlet of the other side of the condenser unit 26 where it is heated from the energy provided from the condensing fluid on the other side of the condenser 26. A heated fluid stream exits outlet 38 of the condenser unit 26 and is fed directly into an inlet 116 of the second evaporator unit 112. Again, it is to be appreciated that the condenser unit 26 is intended only to transfer heat energy to stream 36 inputted into the condenser unit 26, by removing that heat energy from the stream 27 that was fed into condenser unit 26. Furthermore, it should be appreciated that at least some of the feed water input to the condenser unit 26 is provided to the second evaporator unit 112.

The second evaporator unit 112 undergoes a similar evaporative process on the concentrated fluid fed into the second evaporator unit 112 fed into the inlet 116.

In this respect, the evaporator unit 112 and attached condenser 126 produce a purified fluid stream from product stream 128 and a further concentrated fluid in stream 122. This forms a second concentration fraction of the fluid fed into the first evaporator unit 12.

Again, this further concentrated fluid flows out from the bottom outlet 122 to the diverter valve 130 where any desired amount of the further concentrated fluid can be removed from the process. The remaining concentrated fluid flows to the inlet of the other side of the second condenser unit 126 where it is heated from the energy provided from the condensing fluid on the other side of the second condenser 126. A heated fluid stream exits outlet 138 of the condenser unit 126.

It should be understood that this fluid stream 138 could be fed into yet another evaporator unit (not illustrated) operated to produce yet a further a purified fluid stream and a further concentrated fluid, which too could also be fed into another evaporator unit similarly connected in series and so on.

Similarly, product flow rate could be increased by using one or more operatively connected series of these evaporative units and condensers. In this respect, each of the evaporator units would be operated in parallel.

The illustrated process 10 also preferably includes a control system (not illustrated), such as a PLC type control system, used to control the concentration of the suspended or dissolved content in each of the sumps 24, 124 of the evaporator units 12 and 112 within a predetermined concentration range. This control system can monitor and adjust any number of process variables in order to control the concentration of the suspended or dissolved content in each of the sumps 24, 124 of the evaporator units 12 and 112 within a predetermined concentration range. In this case, each of the temperature of the fluid fed into the respective evaporator units 12 and 112, the internal pressure of the respective evaporator units 12 and 112, the flow rate of concentrated fluid removed from the sump 12 and 124 of the respective evaporator units 12 and 112, and the flow rate of the initial feed fluid that is fed into the respective evaporator units 12 and 112 are monitored and adjusted in order to maintain the concentration of the suspended or dissolved content of the concentrated fluid in each of the sumps 24, 124 of the evaporator units 12 and 112.

Pumping units (not illustrated) or other fluid movement devices can be incorporated into selected process streams where required.

Figure 2:
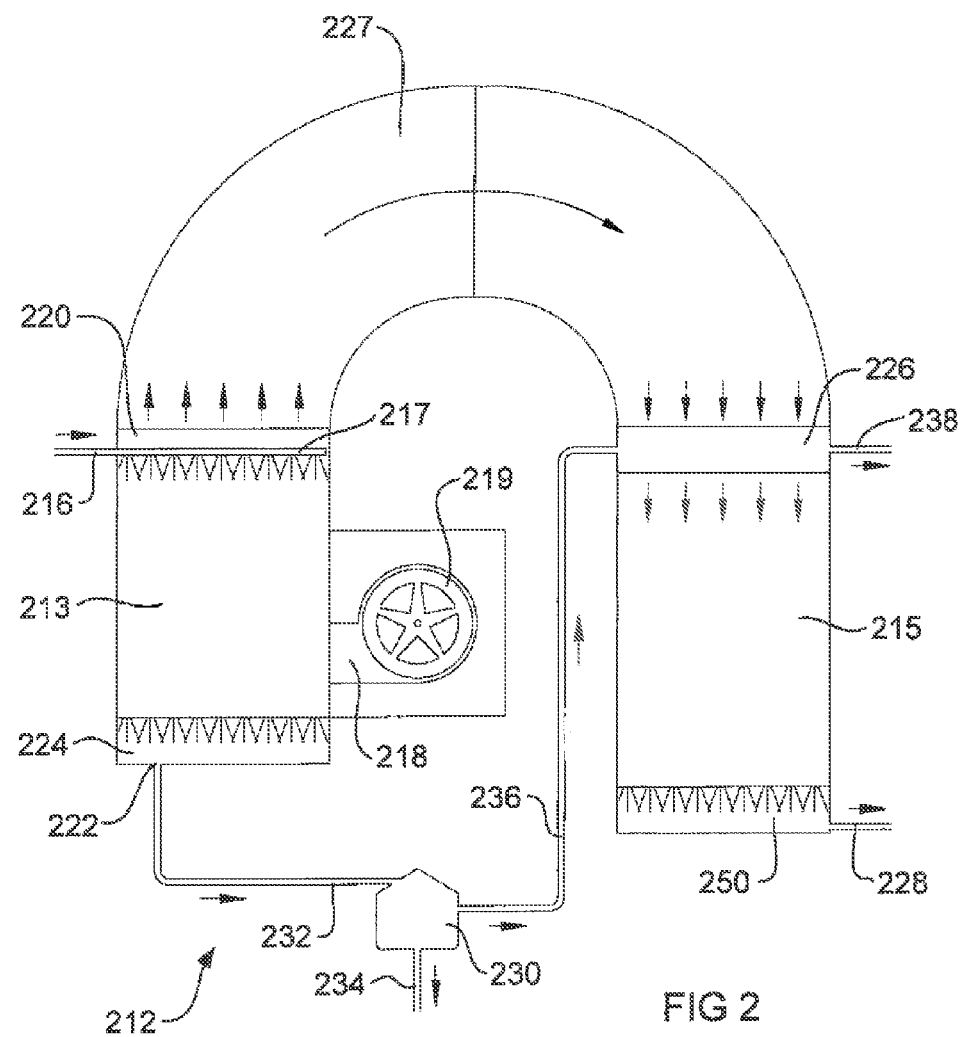
FIG. 2 is a schematic view of one evaporator unit used in the concentration fractionation process shown in FIG. 1.

Referring now to FIG. 2, there is shown a schematic diagram of one preferred evaporator unit configuration 212 according to the present invention. This evaporator unit 212 could be used for the first evaporator unit 12, second evaporator unit 112 and/or any further evaporator unit in a process 10 similar to that shown in FIG. 1. For convenience of reference, similar components in this evaporator unit configuration 212 shown in FIG. 2 corresponding to those shown for the first evaporator unit 12 illustrated in FIG. 1 have been designated with the same reference numeral plus 212.

The illustrated evaporator unit 212 is a spray feed evaporator unit having two sections, an evaporative section 213 where fluid fed into the evaporator unit undergoes adiabatic evaporation, and a condensation section 215 where fluid vapour can condense and be collected.

The evaporative section 213 includes a feed inlet 216 through which fluid is fed into a spray device 217. Air is blown into the evaporator unit 212 through an air inlet 218 which has a fan 219 fluidly connected to it. Again, the bottom of the evaporator unit 212 includes a sump section 224 where fluid collects. However, in this configuration the top outlet 220 is configured as part of an integral curved conduit 227 which is fitted to the top of the evaporator and leads to a condensation section 250 of the evaporator 212. Bottom outlet 222 of the evaporative section 213 is fluidly connected to a diverter valve 230 which can be used to divert a predetermined amount of fluid from fluid stream 232 to a product stream 234. The remaining fluid from fluid stream 32 flows to the inlet of the one side of a condenser unit 226 of the condensation section 215.

The condensation section 215 includes the condenser unit 226. The condenser unit 226 is used to condense any vapour produced from the evaporator section 213. A liquid product is collected in a condensation sump 250 and exits the evaporator unit 212 through product stream 228. Again, the condenser unit 226 can be any suitable type of heat exchanger capable of handling a condensing gaseous stream and a liquid stream.

Referring now to FIGS. 3 to 6, there is shown a number of different configurations of evaporator units 300, 310, 320, 330 that can be used in a fractionation process according to the present invention.

FIG. 3, is a perspective view of the exterior of one evaporator unit 300 according to the present invention. This particular evaporator unit 300 functions in a generally similar manner to that described in relation to the evaporator unit 212 shown in FIG. 2, having an evaporative section 313 where fluid fed into the evaporator unit 300 undergoes adiabatic evaporation, and a condensation section 315 where fluid vapour can condense and be collected. This single evaporator unit 300 can be connected in series and/or in parallel to form single or multi-dimensional array to process the input fluid stream.

FIG. 4 shows a single linear array 310 of five evaporator units 300 connected in series in a similar manner as shown and described in relation to the process 10 shown in FIG. 1. In this particular process, a feed fluid, for example a contaminated water flow can be inputted into the first evaporator unit 300 in the array and five different concentration fractions of concentrated fluid can be produced from each of the evaporator units 300 in the series. These concentration fractions can be can be selectively utilised, mixed or the like by a user or a control system.

FIG. 5 shows a two dimensional stacked linear array 320 of ten rows 325 of ten evaporator units 300 connected in series in a similar manner as shown and described in relation to the process 10 shown in FIG. 1. In this particular process, a feed fluid, for example a contaminated water flow can be inputted into the first evaporator unit 300 in the array and ten different concentration fractions of concentrated fluid can be produced from each of the rows 325 of evaporator units 300 in the series. Alternatively, the two layers could be run in parallel so that two vertically stacked row 325 of evaporator units 300 produce a similar concentrated fluid. In this case, five different concentration fractions of concentrated fluid can be produced from each of the rows 325 of evaporator units 300 in the series. These concentration fractions can be can be selectively utilised, mixed or the like by a user or a control system.

FIG. 5 shows a three dimensional stacked linear array 330 of fifty rows 331 of ten evaporator units 300 connected in series in a similar manner as shown and described in relation to the process 10 shown in FIG. 1. Each section of evaporators 332, 334, 336, 338 and 340 include ten rows 321 of ten evaporator units 300 connected in parallel, each evaporator units 300 producing a concentrated fluid of a selected and controlled level. In this particular process, a feed fluid, for example a contaminated water flow can be inputted into the first evaporator unit 300 in the array and five different concentration fractions of concentrated fluid can be produced from each of section of evaporator units 300 in the series. As shown in FIG. 6, section 332 produces a concentration level of 6%, section 334 produces a concentration level of 12%, section 336 produces a concentration level of 18%, section 338 produces a concentration level of 24%, section 340 produces a concentration level of 30%. These concentration fractions can be can be selectively utilised, mixed or the like by a user or a control system.

The process according to the present invention can therefore be used for the production of salt and/or other minerals that can be extracted from a fluid input stream. This fluid can be a natural water source such as a mineral water source or sea water/salt water, a brine stream from a desalination plant, a bitterns stream from a mine, a contaminated water source such as a polluted water stream, or any other mixture of fluids. The evaporator units 12, 112, 212, 300 can therefore be used in a single or multi-dimensional array to process that input stream as for example is shown in FIGS. 4 to 6.

In some embodiments various additives, surfactants, flotation additives or other separation aids could be added to the fluid fed into an evaporator unit 12, 112, 212, 300 and/or concentrated fluid in order to facilitate recovery of the one or more of the suspended or dissolved content. For example, chemical additives could be added to the concentrated fluid in the sump of an evaporator unit (for example evaporator unit 12 in FIG. 1) to encourage or control crystallization of certain minerals within some or all connected units. The resulting outcome of such chemical addition is that minerals can be extracted from a process according to the present invention. In the case of controlling the suspended or dissolved content (in some cases contaminant level) in at least some evaporator units of an array of such evaporator units is kept within certain concentration ranges, those extracted minerals will only crystallize only within the concentration ranges controlled by the control unit in each evaporator unit. However, it should be appreciated that in other embodiments, it is not necessary to add any additives in order to extract minerals from the fluid feed.

One particular example that this process can be used for is the extraction of table salt, sodium chloride, from salt water. It should be appreciated that this salt water can be sources from the sea, from the brine stream of a desalination plant, or another source. Salt water can be fed into the process (say for example process stream 16 in FIG. 1). The evaporative process therefore produces two concentrated brine solutions in the sumps of the evaporator units 12 and 112. Further concentrated brine solutions could be produced by using further evaporator units (not illustrated) connected in series with the evaporator units 12 and 112. Advantageously, substantially purified water can be extracted from product streams 28 and 128 which can used for other applications, such as irrigation, process water, drinking water (if it is potable) or similar. The various brine solutions can be processed to the point that all the water has been extracted, therefore producing salt. Alternatively, a chemical additive could be added to one or more of the concentrated brine solutions (within the evaporator unit or after being tapped off in stream 34 and/or 134 using valve 30 or 130 respectively) to initiate crystallisation of the Sodium chloride.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A fractionation process for producing at least two concentration fractions of a fluid comprising a solute, suspended or dissolved content using at least two fluidly connected evaporator units, the process comprising the steps of:
   feeding a feed fluid comprising the solute, suspended or dissolved content into at least a first evaporator unit;
   evaporating a first amount of fluid from the feed fluid in at least the first evaporator unit to produce a first concentrated fluid;
   feeding at least a portion of the first concentrated fluid into at least a second evaporator unit;
   evaporating a second amount of fluid from the first concentrated fluid in at least the second evaporator unit to produce a second concentrated fluid,
   controlling the concentration of the suspended or dissolved content of one or more of the first or second concentrated fluid within a predetermined concentration range; and
   diverting a portion of the first concentrated fluid from a flow path from between the first evaporator unit and the second evaporator unit to produce a product stream.

2. A fractionation process according to claim 1, further comprising one or more further evaporating steps in at least one further evaporator unit fluidly connected to at least one of the first or second evaporator units, wherein a further amount of fluid is evaporated from the concentrated fluid fed into the at least one further evaporator unit to produce a further concentrated fluid.

3. A fractionation process according to claim 1, wherein the steps of evaporating the first amount of fluid and evaporating the second amount of fluid are conducted in at least two operatively connected evaporator units that are connected in series.

4. A fractionation process according to claim 1, comprising at least one of the following additional steps of:
   condensing the first amount of fluid after evaporating the first amount of fluid; and
   condensing the second amount of fluid after evaporating the second amount of fluid.

5. A fractionation process according to claim 4, wherein the step of condensing the first amount of fluid comprises the step of:
   transferring energy from the first amount of fluid evaporated to the concentrated fluid fed into the second evaporator unit.

6. A fractionation process according to claim 4, wherein one or more of the steps of condensing the first amount of fluid and condensing the second amount of fluid are conducted in a heat exchanger.

7. A fractionation process according to claim 1, wherein one or more of the evaporating steps comprises an adiabatic evaporation process.

8. A fractionation process according to claim 1, wherein one or more of the evaporating steps comprises the step of:
   spraying into the respective evaporator unit the fluid fed into the respective evaporator unit.

9. A fractionation process according to claim 1, further comprising the step of:

feeding a selected amount of the first amount of concentrated fluid into the second evaporator unit to facilitate the precise control of the concentration of the fluid within the second evaporation unit.

10. A fractionation process according to claim 9, wherein the step of controlling the concentration of the suspended or dissolved content of one or more of the first or second concentrated fluids comprises the steps of controlling one or more of a temperature of the fluid fed into the respective evaporator unit, the internal pressure of the respective evaporator unit, the flow rate of concentrated fluid removed from the respective evaporator unit, or the flow rate of the initial feed fluid that is fed into the respective evaporator unit.

11. A fractionation process according to claim 1, further comprising the step of:
   introducing at least one additive to crystalise one or more of the suspended or dissolved content of the first, second or a further concentrated fluid.

12. A fractionation system for producing at least two concentration fractions of a fluid comprising a solute, suspended or dissolved content, the system comprising:
   a first evaporator unit for evaporating a first amount of fluid from a first feed fluid to produce a first concentrated fluid; and
   a second evaporator unit for evaporating a second amount of fluid from a second feed fluid to produce a second concentrated fluid;
   wherein the second evaporator unit is fluidly connected to the first evaporator unit such that the first concentrated fluid is the second feed fluid; and
   a controller for controlling the concentration of the suspended or dissolved content of one or more of the first or second concentrated fluid within a predetermined concentration range; and
   a diverter valve for diverting a predetermined amount of fluid from a fluid flow path between the first evaporator unit and the second evaporator unit to produce a product stream.

13. A fractionation system according to claim 12, further comprising at least one further evaporator unit, with the first evaporator unit fluidly connected to the second evaporator unit such that the first concentrated fluid is fed to the second evaporator unit and the second evaporator unit is fluidly connected to the at least one further evaporator unit such that the second concentrated fluid is fed to the at least one further evaporator unit.

14. A fractionation system according to claim 13, wherein one or more of the first, second or a further evaporator unit is operatively connected to one or more complementary evaporator units which are fed substantially the same feed fluid as the first, second or further evaporator unit respectively and produce substantially the same first, second or a further concentrated fluid.

15. A fractionation system according to claim 14, wherein one or more of the complementary evaporator units are fluidly connected to the further evaporator unit.

16. A fractionation system according to claim 13, further comprising a condensing unit in which the first, second or a further amount of fluid is condensed.

17. A fractionation system according to claim 16, wherein the condensing unit comprises a heat exchanger in which energy is transferred from the first amount of fluid to the first concentrated fluid fed into the second evaporator unit.

18. A fractionation system according to claim 12, wherein one or more of the evaporator units comprises a spray device for spraying liquid fed into that evaporator unit.

19. A fractionation system according to claim 12, wherein the first evaporator unit comprises a first sump in which the first concentrated fluid is collected, and the second evaporator unit comprises a second sump in which the second concentrated fluid is collected, with the first sump being in fluid connection with an inlet to the second evaporator unit.

20. A fractionation system according to claim 12, wherein one or more of the evaporator units comprises a fan unit for producing convective heat transfer conditions within the evaporator unit to enhance evaporation of the fluid fed into the respective evaporator unit.

21. A fractionation system according to claim 20, wherein the fan unit produces a transverse or counter current air flow to the fluid fed into the evaporator unit.

* * * * *

UNITED STATES PATENT AND TRADEMARK OFFICE
CERTIFICATE OF CORRECTION

PATENT NO. : 8,591,704 B2  Page 1 of 1
APPLICATION NO. : 12/933130
DATED : November 26, 2013
INVENTOR(S) : Stephen Shelley It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 468 days.

Signed and Sealed this
Twenty-second Day of September, 2015

Michelle K. Lee
*Director of the United States Patent and Trademark Office*